United States Patent
Petruska et al.

(10) Patent No.: US 7,115,059 B2
(45) Date of Patent: Oct. 3, 2006

(54) PINION HOUSING WITH CONTAMINANT DEFLECTOR

(75) Inventors: Paul H. Petruska, Royal Oak, MI (US); Paul J. Lloyd, Rochester Hills, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 176 days.

(21) Appl. No.: 10/976,257

(22) Filed: Oct. 28, 2004

(65) Prior Publication Data
US 2006/0094558 A1    May 4, 2006

(51) Int. Cl.
F16H 57/02    (2006.01)
F16H 48/06    (2006.01)

(52) U.S. Cl. ........................ 475/230; 74/607
(58) Field of Classification Search ............... 475/220, 475/230; 74/606 R, 607
See application file for complete search history.

(56) References Cited

U.S. PATENT DOCUMENTS

| 2,477,576 A | 8/1949 | Buckendale |
| 2,478,180 A | 8/1949 | Buckendale |
| 5,620,388 A | 4/1997 | Schlegelmann et al. |
| 6,077,166 A | 6/2000 | Reynolds |
| 6,311,985 B1 | 11/2001 | McKeeby et al. |
| 2002/0198075 A1 | 12/2002 | Prucher |

FOREIGN PATENT DOCUMENTS

| DE | 19945897 | 4/2000 |
| EP | 0602364 | 11/1993 |
| JP | 04302756 | 10/1992 |
| JP | 07061253 | 3/1995 |

*Primary Examiner*—Dirk Wright
(74) *Attorney, Agent, or Firm*—Harness, Dickey & Pierce, P.L.C.

(57) ABSTRACT

An axle assembly includes a carrier housing having a deflector, a differential assembly, and an input shaft. The carrier housing has a main body and a pinion nose extending from the main body. The pinion shaft and the differential assembly are each rotatably supported by the carrier housing in driving engagement with one another. The pinion shaft extends through an aperture in the pinion nose. The deflector extends across at least a portion of an outer surface of the pinion nose to redirect contaminants from entering the carrier housing.

24 Claims, 11 Drawing Sheets

PINION HOUSING WITH CONTAMINANT DEFLECTOR

FIELD OF THE INVENTION

The present invention relates to automotive axle assemblies. In particular, the present invention relates to a deflector located on an exterior surface of a differential carrier pinion nose.

BACKGROUND OF THE INVENTION

A conventional vehicle rear axle assembly typically includes a differential carrier housing having a main body and a pinion nose extending from the main body. An input pinion shaft extends through an aperture in the pinion nose and transfers torque from a vehicle power train to a differential assembly. A pinion seal is positioned generally between the input shaft and an interior surface of the pinion nose to prevent undesired materials and liquids, originating from the vehicle or elsewhere, from contacting the seal and/or entering the interior of the differential carrier housing. The materials often slide down an exterior surface of the pinion nose to reach the seal.

Accordingly, there is a need in the art for an improved axle assembly that prevents undesired materials from contacting the pinion seal and from possibly entering the interior of the differential carrier housing.

SUMMARY OF THE INVENTION

In one form, the present invention provides for an axle assembly for a motor vehicle. The axle assembly comprises a carrier housing, a case, a plurality of pinion gears, a plurality of side gears, a pinion shaft, a ring gear, a pinion seal, and a deflector. The carrier housing has a main body and a pinion nose extending from the main body. The case is positioned within the main body. The plurality of pinion gears and the plurality of side gears are each rotatably coupled to the case. Each of the side gears are in meshing engagement with each of the pinion gears. The pinion shaft engages the ring gear and extends through the pinion nose to a position exterior of the carrier housing. The pinion seal is positioned between the pinion shaft and an interior surface of the pinion nose. The deflector extends across at least a portion of an outer surface of the pinion nose. The deflector is operable to direct foreign materials present on the outer surface of the pinion nose away from the pinion seal.

In another form, the present invention provides for an axle assembly for a motor vehicle comprising a cast carrier housing. A deflector is cast with the carrier housing. The deflector is integral with the pinion nose and extends across at least a portion of an outer surface of the pinion nose. The deflector protrudes from the outer surface of the pinion nose.

In another form, the present invention provides for a differential assembly carrier housing for a motor vehicle comprising a main body, a pinion nose, a basin, and a deflector. The pinion nose extends from the main body. The basin is integral with the pinion nose. The deflector extends around less than an entirety of the pinion nose. The deflector is confined to a region of the pinion nose devoid of the basin.

In still another form, the present invention provides for an axle assembly for a motor vehicle. The axle assembly comprises a carrier housing, a case, a ring gear, a plurality of pinion gears, a plurality of side gears, a pinion shaft, a pinion seal, and a deflector. The carrier housing has a main body and a pinion nose extending from the main body. The carrier housing is mounted to an under surface of the motor vehicle such that the pinion nose extends further from the under surface than the main body does. The main body is at least partially defined by a wall member having an exterior surface. The case is rotatably positioned within a cavity defined by the main body. The ring gear is coupled to the case. The plurality of pinion gears are rotatably coupled to the case. The plurality of side gears are rotatably coupled to the case. Each of the side gears are in meshing engagement with each of the pinion gears. The pinion shaft is in meshing engagement with the ring gear. The pinion shaft extends through the pinion nose to a position exterior of the carrier housing. The pinion seal is positioned between the pinion shaft and an interior surface of the pinion nose. The deflector extends across at least a portion of an outer surface of the pinion nose. The wall member is shaped such that foreign materials present on the exterior surface are urged by gravity to travel from the main body to the pinion nose. The deflector redirects the foreign materials away from the pinion seal.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

Figure 1:
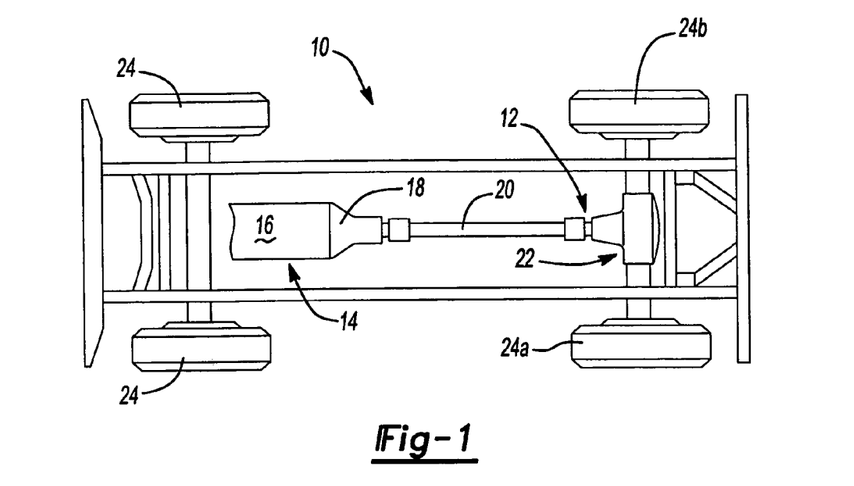
FIG. 1 is a schematic illustration of a motor vehicle constructed in accordance with the teachings of the present invention.

With reference to FIG. 1, a vehicle having an axle assembly constructed in accordance with the teachings of the present invention is generally indicated by reference numeral 10. The vehicle 10 includes a driveline 12 drivable via a connection to a power train 14. The power train 14 includes an engine 16 and a transmission 18. The driveline 12 includes a drive shaft 20, a rear axle 22, and a plurality of wheels 24.

The engine 16 is mounted in an in-line or longitudinal orientation along the axis of the vehicle 10 and its output is selectively coupled via a conventional clutch to the input of the transmission 18 to transmit rotary power (i.e., drive torque) therebetween. The input of the transmission 18 is commonly aligned with the output of the engine 16 for rotation about a rotary axis. The transmission 18 also includes an output and a gear reduction unit. The gear reduction unit is operable for coupling the transmission input to the transmission output at a predetermined gear speed ratio. The drive shaft 20 is coupled for rotation with the output of the transmission 18. Drive torque is transmitted through the drive shaft 20 to the rear axle 22 where it is selectively distributed in a predetermined manner to the left and right rear wheels 24a and 24b, respectively.

Figure 2:
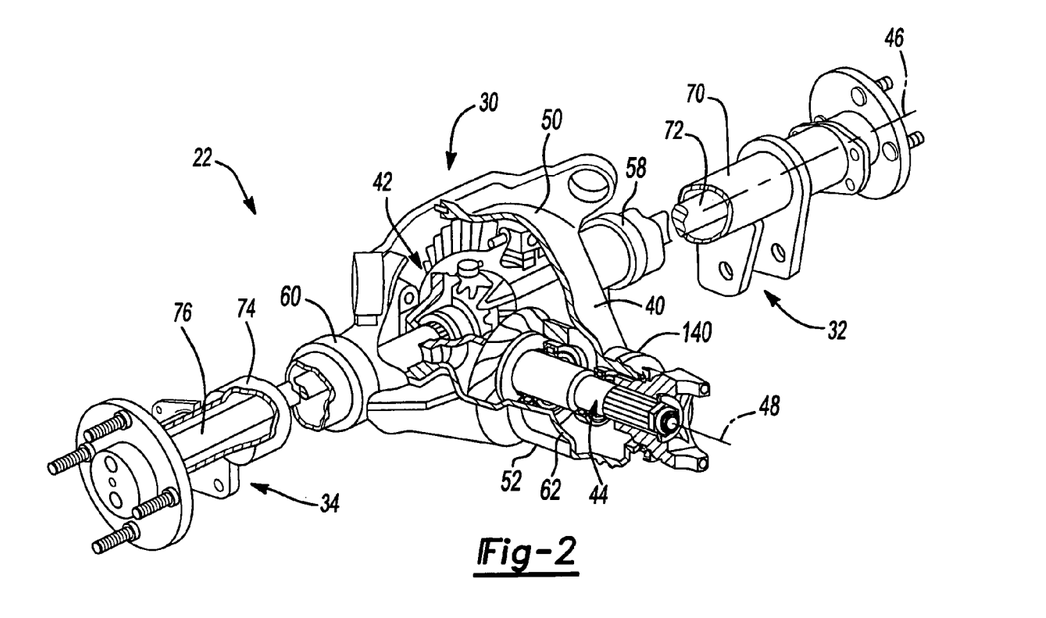
FIG. 2 is a fragmentary perspective view of a portion of the motor vehicle of FIG. 1, illustrating the rear axle in greater detail.

FIG. 2 depicts the rear axle 22 to include a carrier assembly 30, a left axle shaft assembly 32, and a right axle shaft assembly 34. With additional reference to FIGS. 3–5, the carrier assembly 30 includes a carrier housing 40, a differential unit 42, and an input shaft assembly 44. The housing 40 supports the differential unit 42 for rotation about a first axis 46 and further supports input shaft assembly 44 for rotation about a second axis 48 that is perpendicular to the first axis 46.

Figure 3:
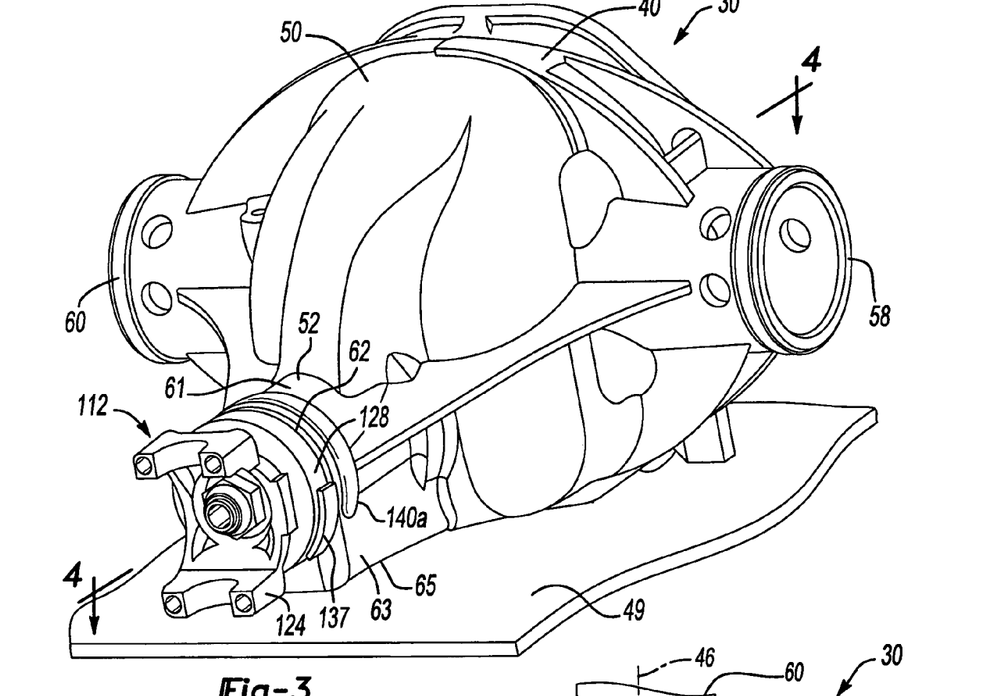
FIG. 3 is a perspective view of a carrier assembly of the motor vehicle of FIG. 1.
Figure 4:
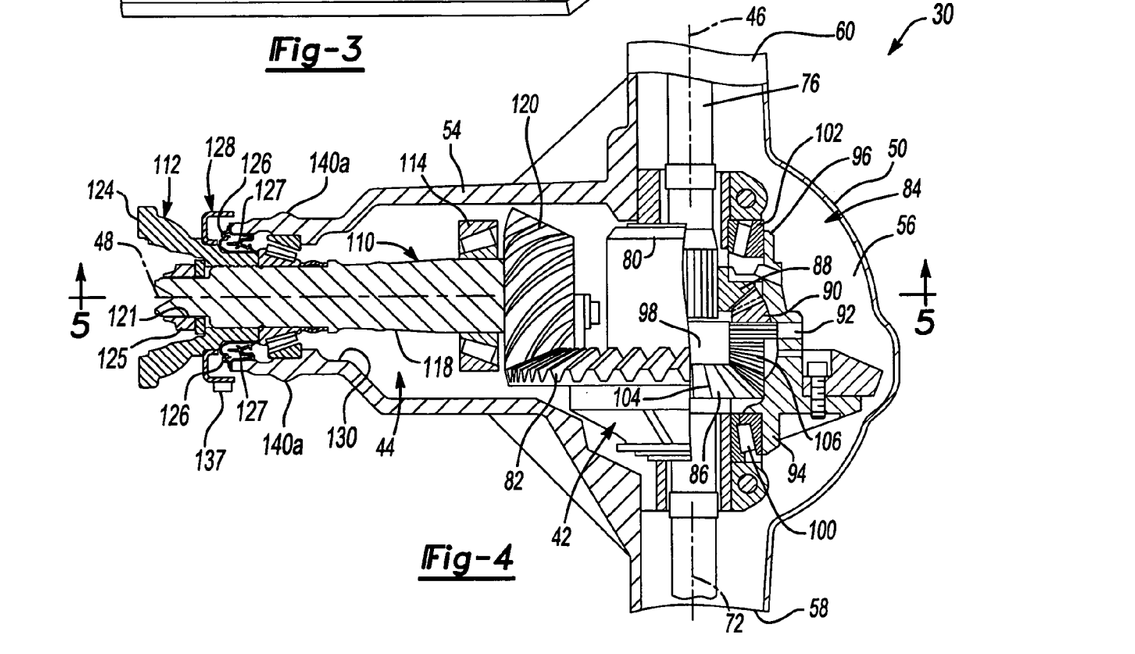
FIG. 4 is a partial section view of the carrier assembly of FIG. 3 taken along line 4—4 of FIG. 3.
Figure 5:
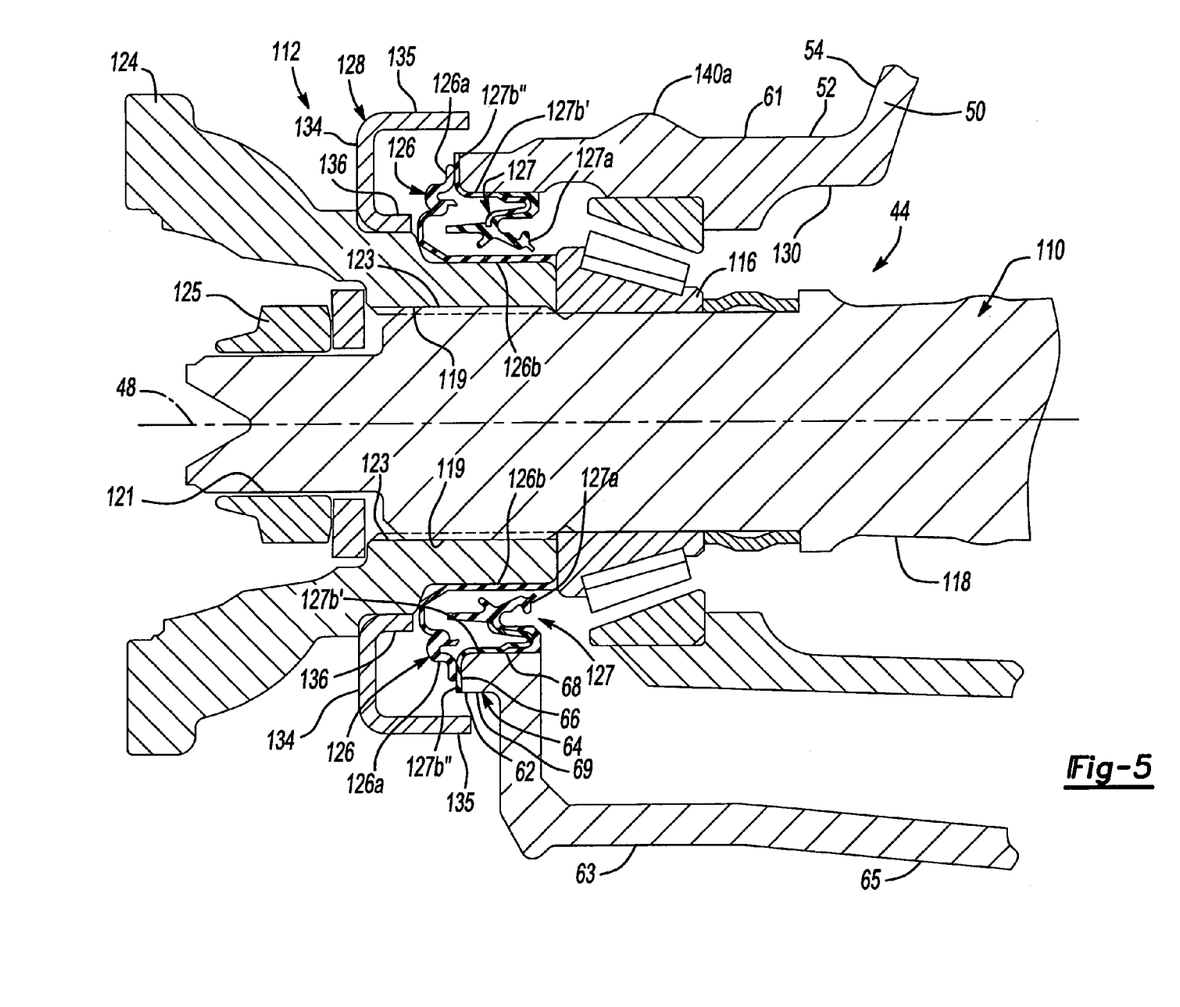
FIG. 5 is a section view of the carrier assembly taken along line 5—5 of FIG. 4.

The housing 40 is initially formed in a suitable casting process and thereafter machined as required. With particular reference to FIGS. 3 and 4, the housing 40 includes a main body 50 and a pinion nose 52 extending from the main body 50. The housing 40 includes a wall member 54 that defines a central cavity 56 having a left axle aperture 58, a right axle aperture 60, and an input shaft aperture 62. With reference to FIG. 5, at the input shaft aperture 62 the pinion nose 52 includes a flange 64 having a face 66, an inner surface 68, and an outer surface 69. As most clearly illustrated in FIGS. 3 and 5, the pinion nose 52 also includes an outer upper surface or a first surface 61 and an outer lower surface or second surface 63. The second surface 63 is closer to a ground surface 49 (FIG. 3) that the vehicle 10 is resting on. At least a portion of the second surface 63 defines an outer surface of an oil return basin 65 of the housing 40, which collects oil and other materials used in the operation of the carrier assembly 30.

With reference to FIG. 3, the housing 40 is mounted to the motor vehicle 10 at an angle relative to a flat ground surface 49 and at an angle relative to an under surface of the motor vehicle 10. The housing 40 is angled such that the pinion nose 52 is closer to the ground 49 than the main body 50. The housing 40 can be mounted at a variety of different angles relative to the ground surface 49 and the under surface of the vehicle 10, such as 5.5 degrees.

Returning to FIG. 2, the left axle shaft assembly 32 includes a first axle tube 70 fixed to left axle aperture 58 and a first axle half-shaft 72 that is supported for rotation in first axle tube 70 about the first axis 46. Similarly, right axle shaft assembly 34 includes a second axle tube 74 that is fixed to right axle aperture 60 and which supports a second axle half-shaft 76 for rotation about the first axis 46.

FIG. 4 depicts the differential unit 42 being disposed within the central cavity 56 of the main body 50 of the housing 40. The differential unit 42 includes a case 80, a ring gear 82 that is fixed for rotation with the case 80, and a gearset 84 that is disposed within the case 80. The gearset 84 includes first and second side gears 86 and 88 and a pair of differential pinions 90, which are rotatably supported on pinion shafts 92 that are mounted to the case 80. The case 80 includes a pair of trunnions 94 and 96 and a gear cavity 98. A pair of bearing assemblies 100 and 102 support the trunnions 94 and 96, respectively, for rotation about the first axis 46.

First axle half shaft 72 and second axle half shaft 76 extend through left and right axle apertures 58 and 60, respectively, where they are coupled for rotation about first axis 46 with first and second side gears 86 and 88, respectively. The case 80 is operable to support differential pinions 90 for rotation within the gear cavity 98 about one or more axes that are perpendicular to the first axis 46. The first and second side gears 86 and 88 each include a plurality of teeth 104 that meshingly engage teeth 106 that are formed on differential pinions 90.

FIG. 5 shows a portion of the input shaft assembly 44 extending through the input shaft aperture 62 and the pinion nose 52. The input shaft assembly 44 generally includes an input pinion shaft 110, a propeller shaft coupling flange assembly 112, and a pair of conventional bearing assemblies 114 and 116. Each of the bearing assemblies 114 and 116 include an outer race that engages the housing 40 in a press-fit manner. The bearing assemblies 114 and 116 cooperate with the housing 40 to support the input pinion shaft 110 for rotation on the second axis 48 in the input shaft aperture 62.

The input pinion shaft 110 includes a tail portion 118 and a head portion 120 integrally formed with one another. The head portion 120 includes a plurality of teeth 122. The teeth 122 meshingly engage teeth of the ring gear 82 to transfer torque from the power train 14 to the differential unit 42. A plurality of external splines 119 are formed on the tail portion 118. An externally threaded portion 121 is formed on a reduced diameter section at the end of the tail portion 118.

The coupling flange assembly 112 generally includes a pinion flange 124, a seal sleeve 126, a seal 127, and a protector ring 128. The pinion flange 124 includes an internal spline 123 in engagement with external splines 119 of the pinion shaft 110. A nut 125 fixedly mounts the pinion flange 124 to the threaded portion 121 of the tail portion 118. At least a portion of the pinion flange 124 is located within the pinion nose 52.

The seal sleeve 126 includes a flexible or rubber portion 126a and a rigid portion 126b, which is often made of steel. The seal sleeve 126 is coupled to an external cylindrical surface of the pinion flange 124 with a press-fit. Specifically, the rigid portion 126b is placed over the external cylindrical surface of the pinion flange 124 approximately between the pinion flange 124 and the inner surface 68 of the pinion nose 52. The flexible portion 126a extends from the rigid portion 126b toward the face 66 [shown in FIG. 5] of the pinion nose 52.

The seal 127 includes a flexible or rubber portion 127a and a rigid portion 127b, which is often made of steel. The seal 127 is fastened to the pinion nose at the face 66. Specifically, the rigid portion 127b includes a first portion 127*b*' and a second portion 127*b*". The first portion 127*b*' extends approximately 90° from the second portion 127*b*". The first portion 127*b*' is inserted within the aperture 62 such that it biasedly engages the inner surface 68 and such that the second portion 127*b*" abuts the face 66 of the aperture 62. The rubber portion 127*a* extends from the rigid portion 127*b* toward the rigid portion 126*b* of the seal sleeve on the pinion flange 124. The rubber portion 127*a* includes various fingers or projections that approximate the rigid portion.

The seal sleeve 126 and the seal 127 can be constructed in any suitable shape and of any suitable material operable to prevent foreign materials from passing into the housing 40 between the pinion flange 124 and the inner surface 130 of the pinion nose 52. The seal sleeve 126 and the seal 127 are shaped and positioned such that the rubber portion 126*a* of the seal sleeve 126 abuts the second rigid portion 127*b*" of the seal 127 to provide an impermeable seal between the interior and exterior of the housing 40. During operation of the axle assembly 10, the seal sleeve 126 rotates relative to the seal 127. The rubber portion 126*a* of the seal sleeve 126 remains in contact with the second rigid portion 127*b*" during this rotation.

The protector ring 128 can also be mounted to the pinion flange 124. Specifically, the protector ring 128 is mounted to the pinion flange 124 at a position external to the housing 40 and adjacent to the seal sleeve 126. The protector ring 128 may be mounted to the pinion flange 124 in any suitable manner, such as a press-fit. The protector ring 128 may be made of any suitable material to prevent foreign materials from damaging the seal sleeve 126 and the seal 127.

The protector ring 128 is generally a cylindrical or annular ring and generally extends around an outer diameter of the input shaft aperture 62. As illustrated in FIG. 5, the protector ring 128 generally has a "U" shape in cross-section. Specifically, the protector ring 128 has a base 134 that is approximately perpendicular to the axis 48 and two side walls 135 and 136 that are approximately perpendicular to the base 134. The side walls 135 and 136 extend from the base 134 toward the seals 126 and 127. The side wall 135 can partially overlap the upper surface 61 of the pinion nose 52. The side wall 136 closely abuts the seal sleeve 126 and is spaced apart from the input shaft aperture 62. In this manner, the protector ring 128 is operable to prevent foreign materials from contacting the seal sleeve 126 and from possibly entering the housing 40.

The protector ring 128 includes a balancing weight 137. The weight 137 can be of any suitable shape or size. The weight 137 is fastened to an exterior of the wall 135 in any suitable manner. The weight 137 can be positioned at most any point on the wall 135 and is operable to dampen vibrations that may be experienced during rotation of the input shaft assembly 44.

The pinion nose 52 further includes a deflector 140. The deflector 140 is located on the upper surface 61 of the pinion nose. The deflector 140 can be positioned at a variety of different locations on the pinion nose 52, such as proximate to or over the tail bearing assembly 116. The deflector 140 can take the form of any detail that will deflect foreign materials traveling down the pinion nose 52 away from the seals 126 and 127.

As illustrated in FIGS. 2 through 5, the deflector 140A is a protrusion that extends from the pinion nose 52 and is integral with and cast with the housing 40. The deflector 140A extends around only the upper surface 61 of the pinion nose 52, which is devoid of the oil return basin 65. Therefore, the deflector 140A does not completely surround the input shaft aperture 62, but rather extends approximately slightly more than 180° about the pinion nose 52.

Figure 6:
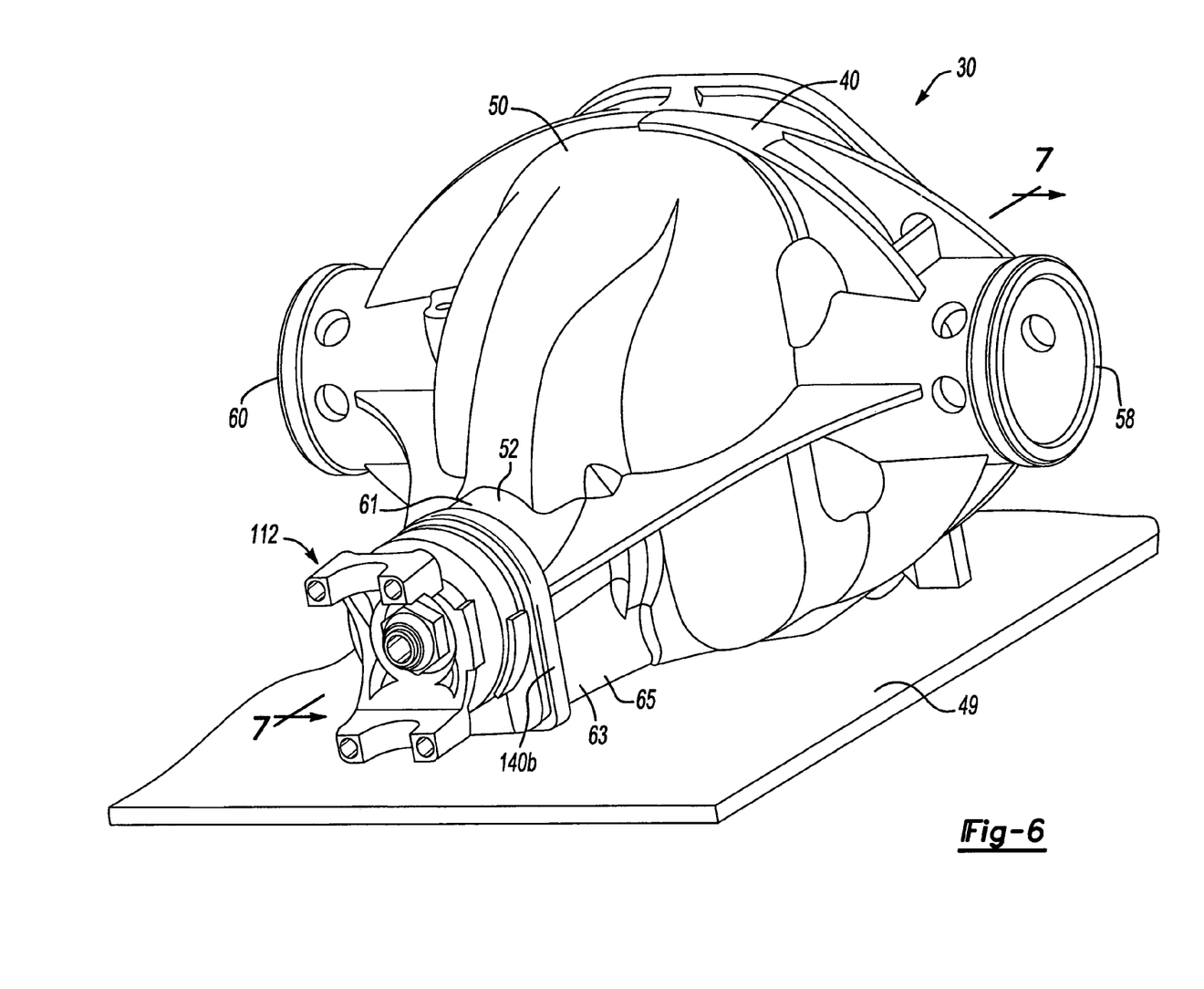
FIG. 6 is a perspective view of a carrier assembly according to another embodiment of the present invention.
Figure 7:
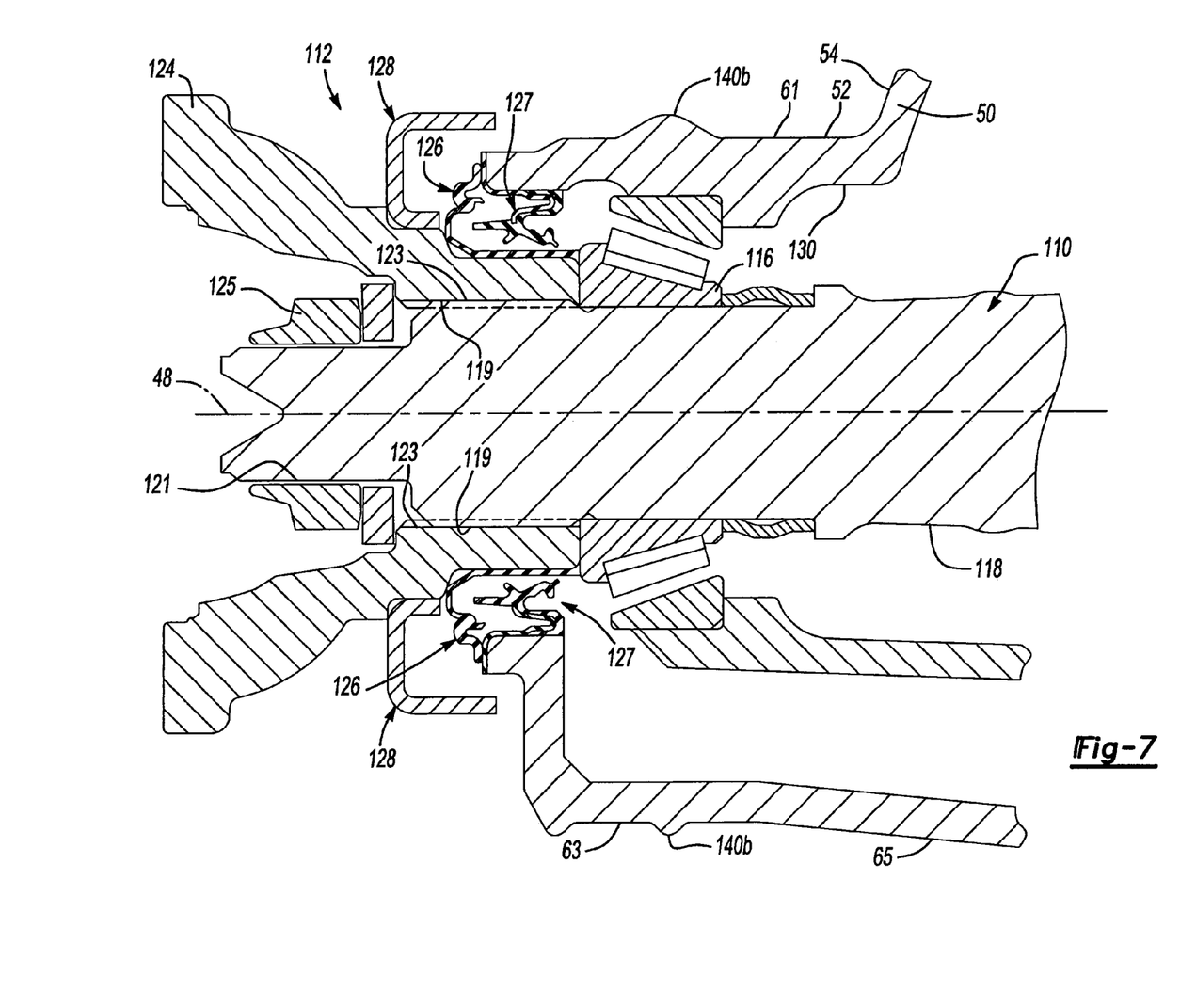
FIG. 7 is a partial section view of the carrier assembly of FIG. 6 taken along line 7—7 of FIG. 6.

In addition to the configuration of the deflector 140A illustrated in FIGS. 1 through 5, the deflector 140 can be provided in various other configurations as well. For example and with reference to FIGS. 6 and 7, a deflector 140B is illustrated. The deflector 140B is similar to the deflector 140 except that the deflector 140B extends completely around the pinion nose 52. Like the deflector 140A, the deflector 140B is integral with the pinion nose 52 and cast together with the carrier assembly 30. The portion of the deflector 140B at or near the lower surface 63 can be more narrow in cross-section than the remainder of the deflector 140B.

Figure 8:
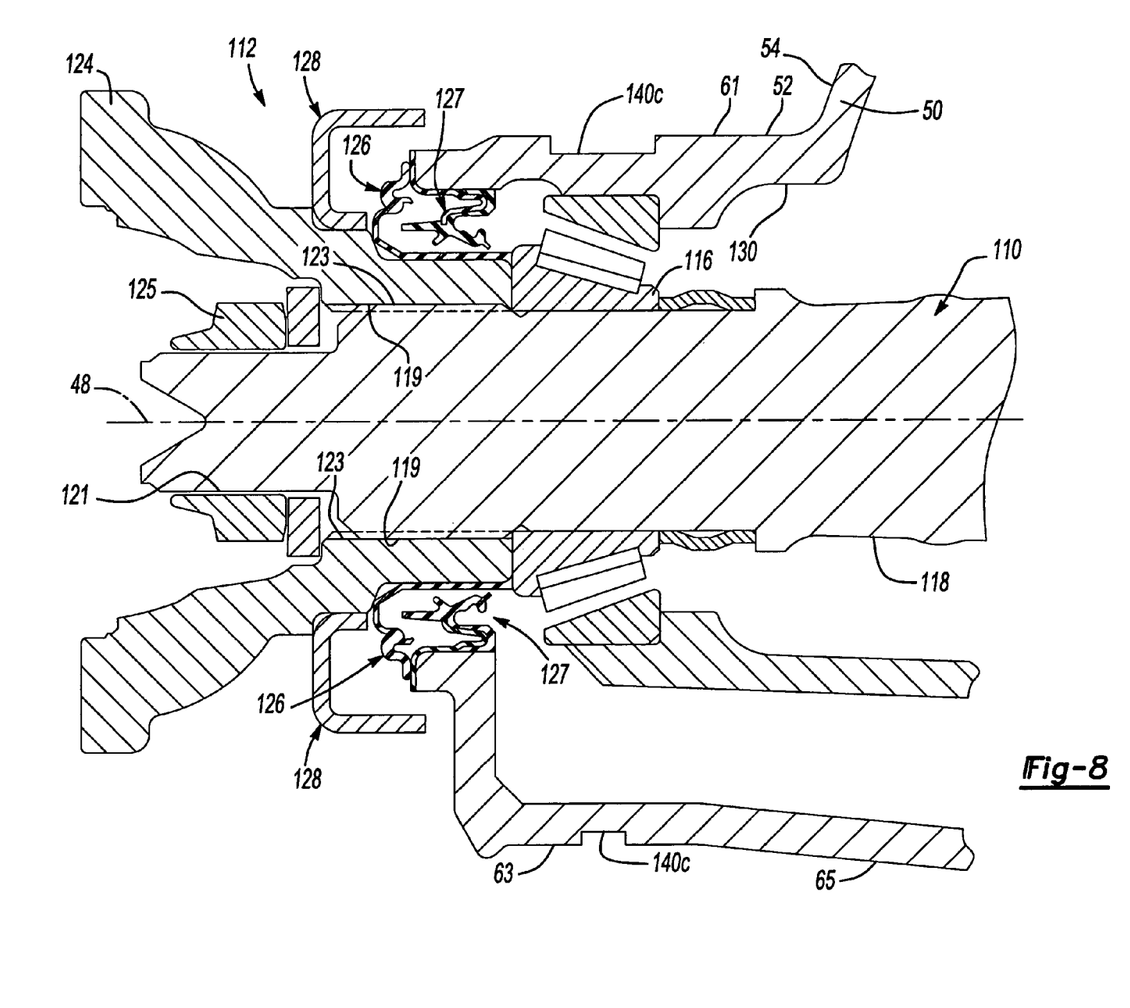
FIG. 8 is a partial section view of a carrier assembly according to an additional embodiment of the present invention.

With additional reference to FIG. 8, a deflector according to another embodiment of the present invention is illustrated at 140C. The deflector 140C is a recess within the upper surface 61 of the pinion nose 52. The deflector 140C is located in substantially the same position that the deflector 140B is located. The deflector 140C can be formed in the pinion nose 52 during casting of the housing 40 or the deflector 140C can be machined in the pinion nose 52 after the housing 40 is cast. As illustrated in FIG. 8, the deflector 140C extends completely around the pinion nose 52. The portion of the deflector 140C at or near the lower surface 63 can be more narrow in cross-section than the remainder of the deflector 140C.

Figure 9:
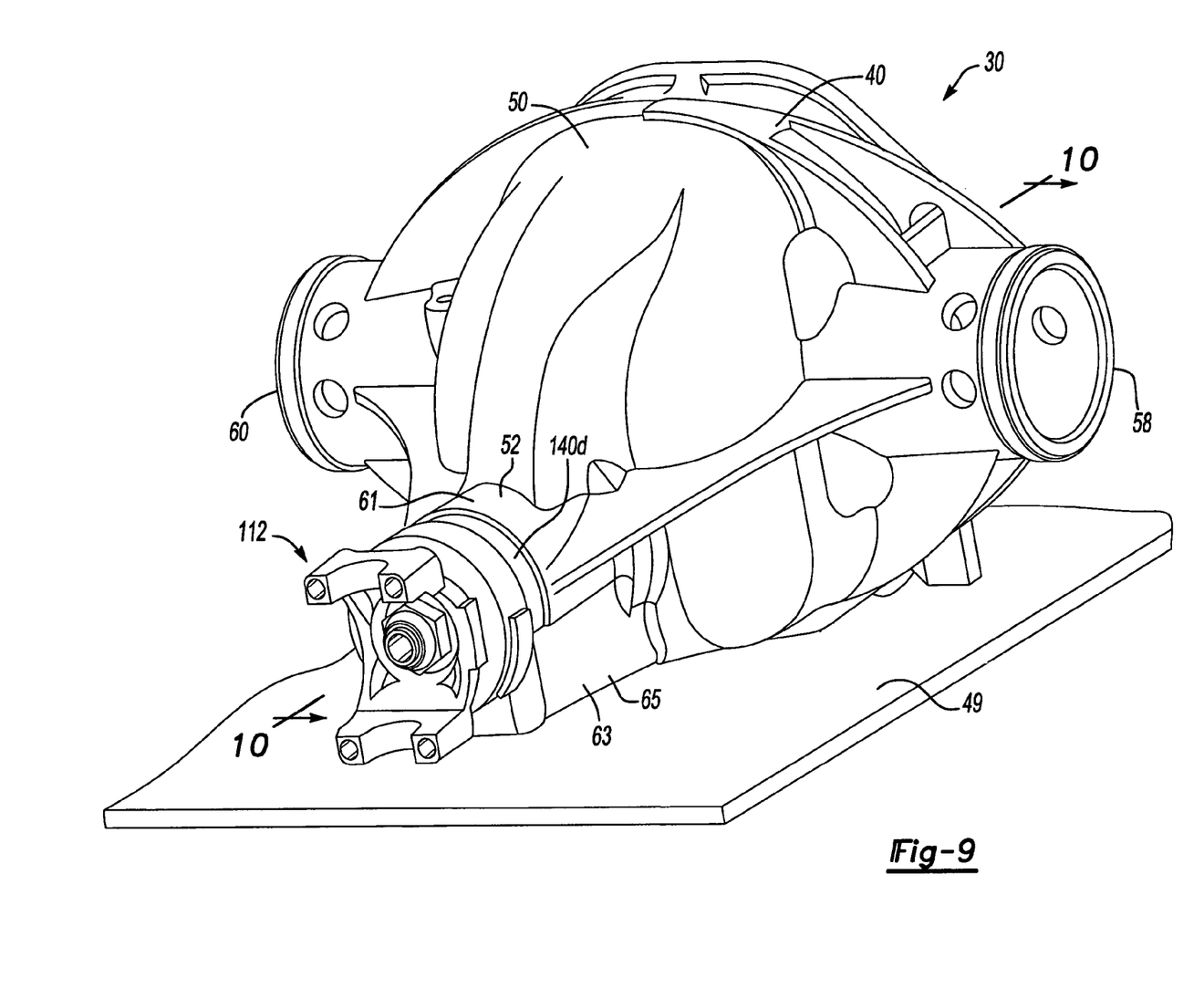
FIG. 9 is a perspective view of a carrier assembly according to a further embodiment of the present invention.
Figure 10:
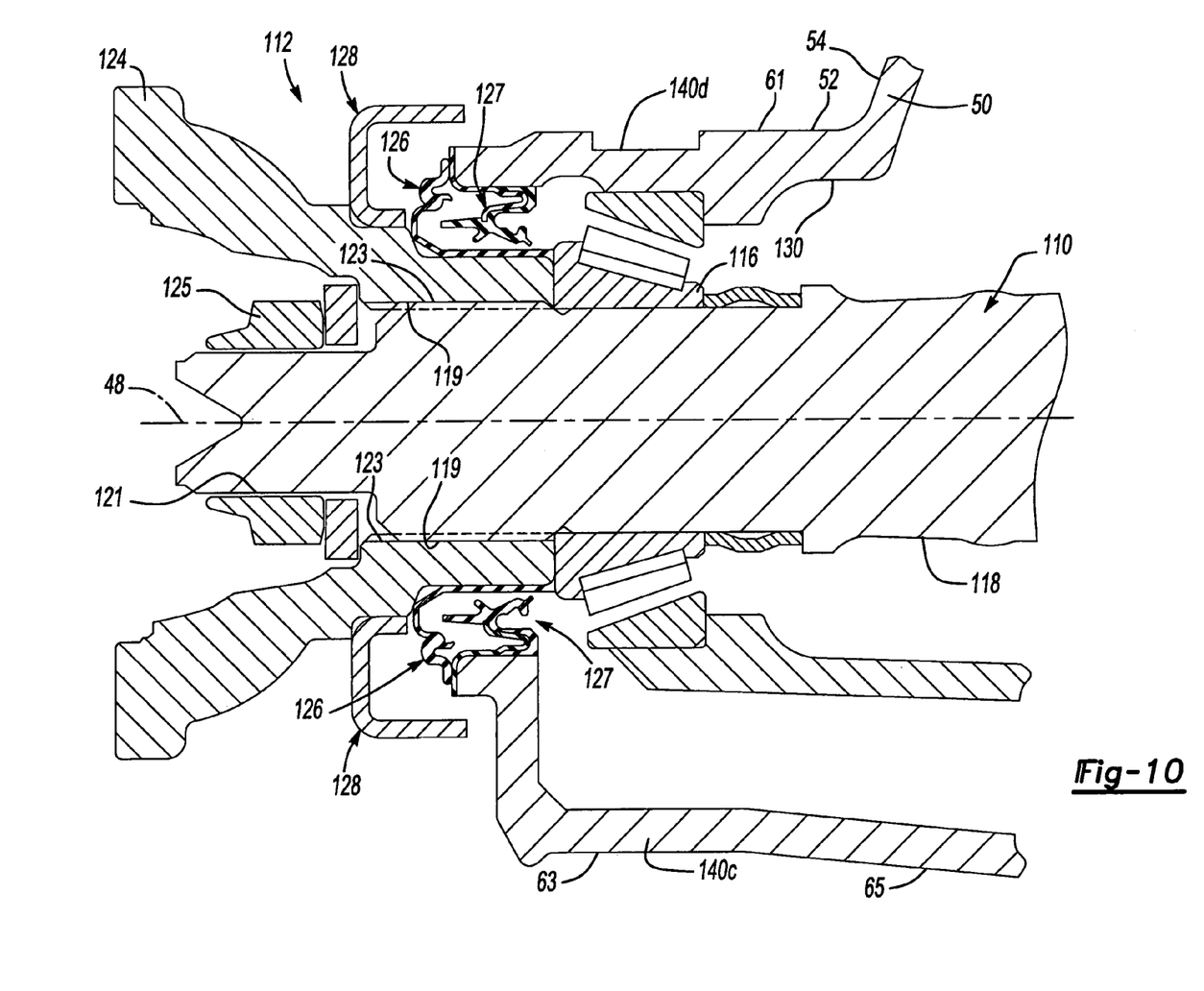
FIG. 10 is a partial section view of the carrier assembly of FIG. 9 taken along line 10—10 of FIG. 9.

With additional reference to FIGS. 9 and 10, a deflector according to yet another embodiment of the present invention is illustrated at 140D. The deflector 140D is similar to the deflector 140C, except that the deflector 140D does not extend completely around the pinion nose 52, but only around the upper surface 61 of the pinion nose, which does not include the oil return basin 65. Therefore, the deflector 140D extends approximately slightly more than 180° around the pinion nose 52. The deflector 140D can be cast with the housing 40 or it can be machined into the pinion nose 52 after the housing 40 has been cast.

Figure 11:
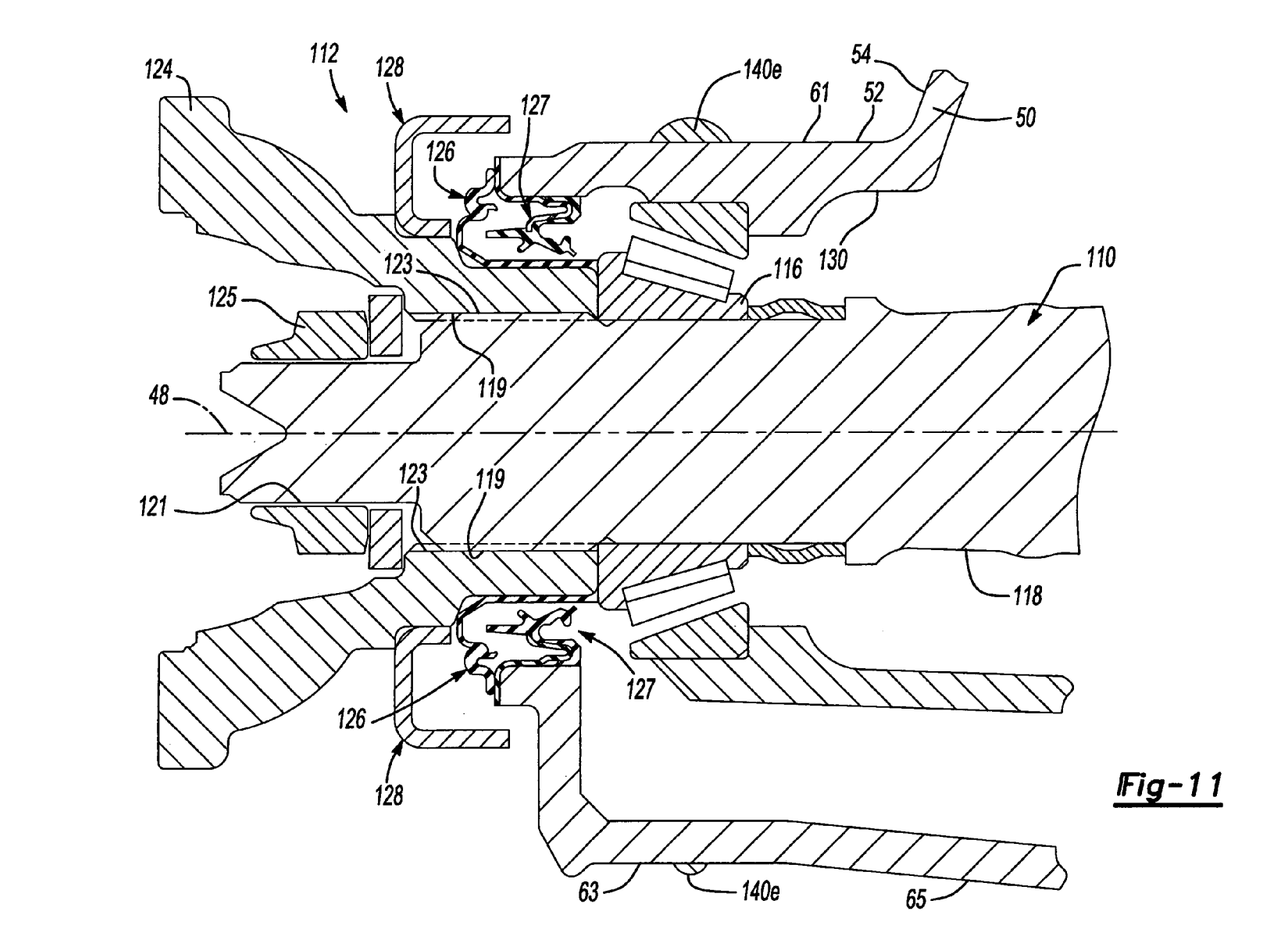
FIG. 11 is a partial section view of a carrier assembly according to another embodiment.

FIG. 11 depicts a deflector according to yet another embodiment of the present invention is illustrated at 140E. The deflector 140E protrudes from the upper surface 61 of the pinion nose 52. The deflector 140E is not cast with the housing 40, but is rather a separate part that is later secured to the pinion nose 52 after casting. The deflector 140E can be secured to the pinion nose 52 using any suitable fastening means. If the deflector 140E is made of an elastic material, the deflector 140E can be placed over the pinion nose 52 and secured into place using a press-fit. The deflector 140E can be made of a variety of different materials in addition to an elastic material. For example, the deflector 140E can be made of any suitable metal, polymer, or any other suitable material known in the art.

Figure 12:
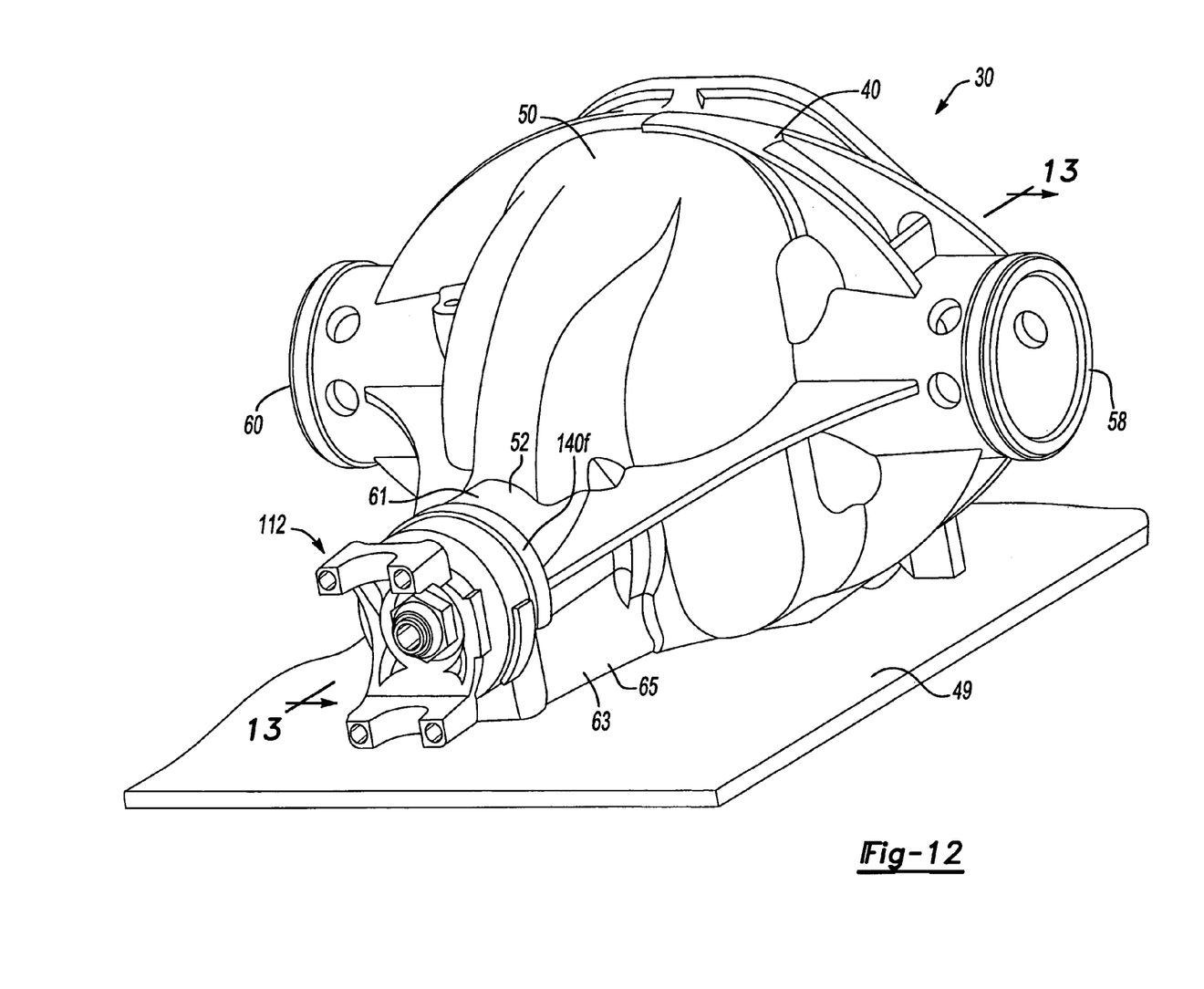
FIG. 12 is a perspective view of a carrier assembly according to a further embodiment of the present invention.
Figure 13:
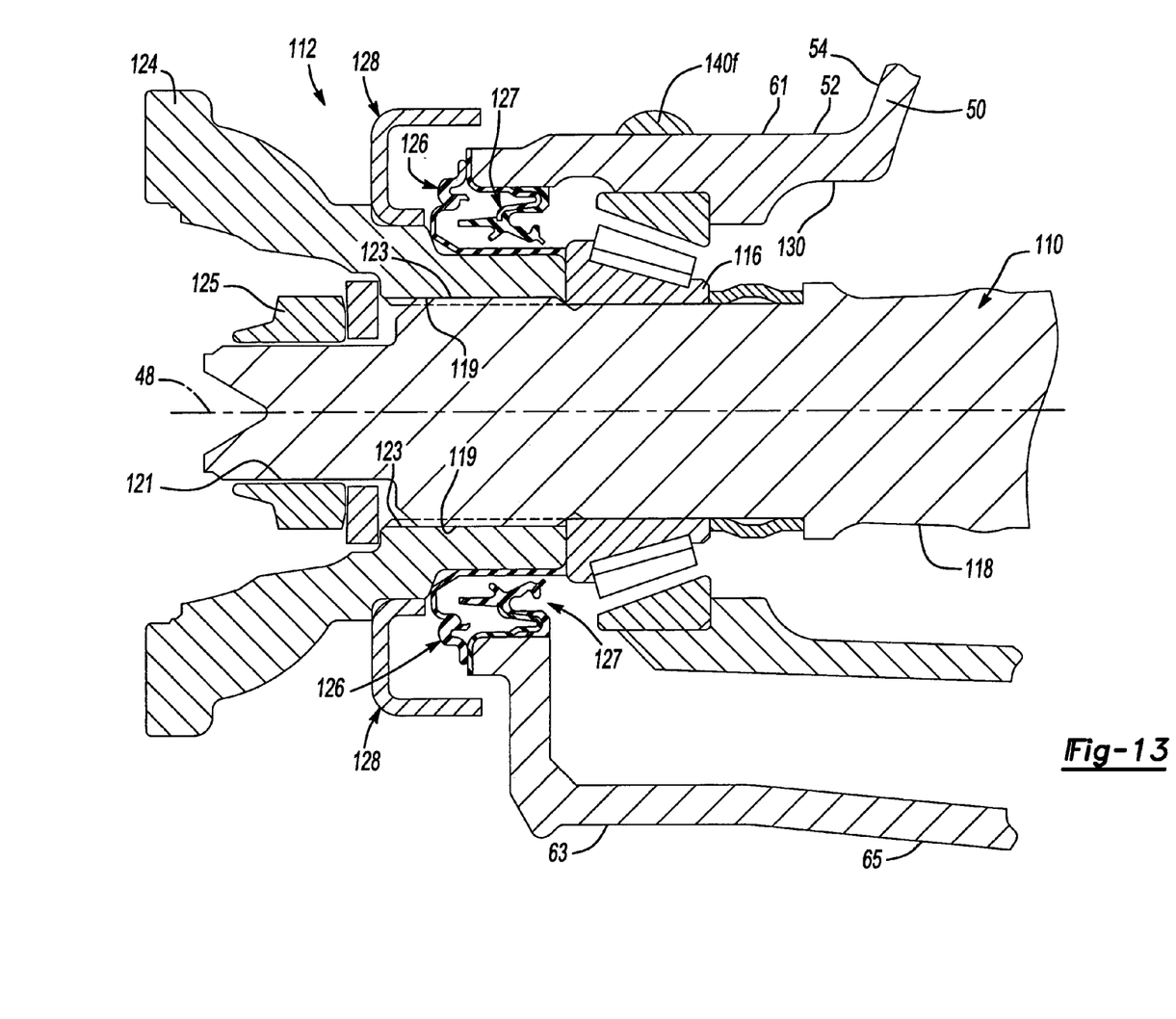
FIG. 13 is a partial section view of the carrier assembly of FIG. 12 taken along line 13—13 of FIG. 12.

A deflector according to a further embodiment of this invention is illustrated at reference numeral 140F in FIGS. 12 and 13. The deflector 140F is substantially similar to the deflector 140E, except that the deflector 140F does not extend completely around the pinion nose 52. Instead, the deflector 140F only extends around the portion of the upper surface 61 of the pinion nose 52 that is devoid of the oil return basin 65. Therefore, the deflector 140F extends approximately slightly more than 180° around the pinion nose 52. The deflector 140F is not cast with the housing 40, but is rather a separate part that is later secured to the pinion nose 52 after casting. The deflector 140F can be secured to the pinion nose 52 using any suitable fastening means. If the deflector 140F is made of an elastic material, the deflector 140F can be placed over the pinion nose 52 and secured into place using a press-fit. The deflector 140F can be made of a variety of different materials in addition to an elastic material. For example, the deflector 140F can be made of any suitable metal, polymer, or any other suitable material known in the art.

Because the carrier assembly 30 is positioned on the underside of the vehicle, materials such as dirt, oil, and various other foreign substances often become deposited on the exterior of the main body 50 and the pinion nose 52. Due to the shape of the main body 50 and because the pinion nose 52 is angled toward the ground 49, gravity often draws the foreign substances deposited on the main body 50 to the pinion nose 52 and across the pinion nose 52 to the seal sleeve 126 and the seal 127. In some instances, the foreign materials may breach the integrity of the seal sleeve 126 and the seal 127 and enter the housing 40. The presence of the deflector 140 interrupts the flow of the foreign materials across the pinion nose 52 and redirects the foreign materials away from the seal sleeve 126 and the seal 127 and off the pinion nose 52. In this manner, the deflector 140 protects the integrity of the seal sleeve 126 and the seal 127.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An axle assembly for a motor vehicle, the axle assembly comprising:
    a carrier housing having a main body and a pinion nose extending from said main body;
    a case rotatably positioned within said main body;
    a ring gear coupled to the case;
    a plurality of pinion gears rotatably coupled to said case;
    a plurality of side gears rotatably coupled to said case, each of said side gears being in meshing engagement with each of said pinion gears;
    a pinion shaft in meshing engagement with said ring gear, said pinion shaft extending through said pinion nose to an exterior of said carrier housing;
    a pinion seal positioned between said pinion shaft and an interior surface of said pinion nose; and
    a deflector extending across at least a portion of an outer surface of said pinion nose, said deflector being operable to direct foreign materials present on said outer surface of said pinion nose away from said pinion seal.

2. The axle assembly of claim 1, wherein said deflector protrudes from said outer surface of said pinion nose.

3. The axle assembly of claim 2, wherein said deflector and said carrier housing are separate parts and said deflector is fastened to said carrier housing.

4. The axle assembly of claim 3, wherein said deflector comprises at least one of a polymeric material and a rubber material.

5. The axle assembly of claim 1, wherein said deflector is recessed within said outer surface of said pinion nose.

6. The axle assembly of claim 1, wherein said carrier housing is a cast carrier housing and said deflector is integrally cast with said cast housing.

7. The axle assembly of claim 1, wherein said deflector comprises at least one of a polymeric material and a rubber material.

8. The axle assembly of claim 1, further comprising a pinion tail bearing operable to rotatably support a tail portion of said pinion shaft, said deflector being positioned substantially coplanar with said pinion tail bearing.

9. The axle assembly of claim 1, said pinion nose further comprising a first surface and a second surface, said second surface being closer to a ground surface that the motor vehicle travels across than said first surface, said deflector being confined to said first surface.

10. An axle assembly for a motor vehicle comprising:
    a carrier housing having a pinion nose with an integrally formed deflector, said deflector extending across at least a portion of an outer surface of said pinion nose, said deflector protruding from said outer surface of said pinion nose;
    a differential assembly positioned within and rotatably coupled to said carrier housing; and
    a pinion shaft in meshing engagement with said differential assembly, said pinion shaft extending through said pinion nose to a position exterior of said housing.

11. The axle assembly of claim 10, further comprising a pinion tail bearing mounted within a cavity defined by said pinion nose, said deflector being positioned substantially coplanar with said pinion tail bearing.

12. The axle assembly of claim 10, said pinion nose further comprising a first surface and a second surface, said second surface positioned closer to a ground surface that the motor vehicle travels across than said first surface, said deflector confined to said first surface.

13. The axle assembly of claim 10, wherein said pinion nose includes a substantially cylindrical outer wall portion, said deflector radially extending from said outer wall portion and partially circumferentially extending about an axis defined by said pinion shaft.

14. A differential carrier housing for a motor vehicle traveling along a ground surface comprising:
    a main body having an exterior surface;
    a pinion nose extending from said main body, said pinion nose having an aperture, a first surface, and a second surface, said second surface positioned closer to the ground surface than said first surface; and
    a deflector extending substantially entirely across said first surface and terminating at said second surface, wherein said exterior surface of said main body is shaped such that foreign materials present on said exterior surface are urged by gravity to travel from said main body to said pinion nose, wherein said deflector redirects the foreign materials away from said aperture.

15. The carrier housing of claim 14, wherein said deflector protrudes from said first surface of said pinion nose.

16. The carrier housing of claim 14, wherein said deflector is recessed within said first surface of said pinion nose.

17. The carrier housing of claim 14, further comprising a pinion tail bearing bore, said deflector positioned coplanar with said pinion tail bearing bore.

18. The carrier housing of claim 14, wherein said deflector and said pinion nose are separate parts and said deflector is fastened to said pinion nose.

19. The carrier housing of claim 14, wherein said deflector is integrally formed with said pinion nose.

20. An axle assembly for a motor vehicle, the axle assembly comprising:
    a carrier housing having a main body and a pinion nose extending from said main body, said main body is at least partially defined by a wall member having an exterior surface;
    a differential assembly positioned within and rotatably coupled to said carrier housing;
    a pinion shaft in meshing engagement with said differential assembly said pinion shaft extending through an aperture formed in said pinion nose;

a pinion seal positioned between said pinion shaft and an interior surface of said pinion nose; and a deflector extending across at least a portion of an outer surface of said pinion nose, wherein said wall member is shaped such that foreign materials present on said exterior surface are urged by gravity to travel from said main body to said pinion nose, wherein said deflector redirects the foreign materials away from said pinion seal.

21. The axle assembly of claim 20, wherein said deflector protrudes from said outer surface of said pinion nose.

22. The axle assembly of claim 20, wherein said deflector is recessed within said outer surface of said pinion nose.

23. The axle assembly of claim 20, wherein said deflector is integral with said pinion nose.

24. The axle assembly of claim 20, wherein said deflector and said pinion nose are separate parts that are fastened together.

* * * * *